United States Patent
Wyler

(10) Patent No.: US 11,374,651 B2
(45) Date of Patent: Jun. 28, 2022

(54) SATELLITE SYSTEM AND METHOD FOR ADDRESSING RAIN FADE

(71) Applicant: WORLDVU SATELLITES LIMITED

(72) Inventor: Gregory Thane Wyler, McLean, VA (US)

(73) Assignee: WORLDVU SATELLITES LIMITED, Mc Lean, VA (US)

(*) Notice: Subject to any disclaimer, the term of this patent is extended or adjusted under 35 U.S.C. 154(b) by 261 days.

(21) Appl. No.: 16/846,894

(22) Filed: Apr. 13, 2020

(65) Prior Publication Data
US 2020/0259559 A1   Aug. 13, 2020

Related U.S. Application Data

(62) Division of application No. 16/128,263, filed on Sep. 11, 2018, now Pat. No. 10,623,089.

(60) Provisional application No. 62/557,020, filed on Sep. 11, 2017.

(51) Int. Cl.
| | |
|---|---|
| *H04B 7/185* | (2006.01) |
| *H04B 17/336* | (2015.01) |
| *H04W 72/04* | (2009.01) |
| *H04B 7/204* | (2006.01) |
| *H04B 17/373* | (2015.01) |
| *H04B 17/318* | (2015.01) |

(52) U.S. Cl.
CPC ..... *H04B 7/18519* (2013.01); *H04B 7/18513* (2013.01); *H04B 7/2041* (2013.01); *H04B 17/318* (2015.01); *H04B 17/336* (2015.01); *H04B 17/373* (2015.01); *H04W 72/0453* (2013.01)

(58) Field of Classification Search
CPC .... H02M 1/4233; H02M 1/42; H02M 1/4208; H02M 7/217; Y02B 70/10; Y02P 80/10
See application file for complete search history.

(56) References Cited

U.S. PATENT DOCUMENTS

| | | | | |
|---|---|---|---|---|
| 9,485,010 | B1* | 11/2016 | Chen | H04B 7/1851 |
| 10,034,183 | B2* | 7/2018 | Buer | H04B 7/18508 |
| 10,178,624 | B2* | 1/2019 | Garcia | H04B 7/18543 |
| 10,587,333 | B2* | 3/2020 | Bhave | H04L 1/0015 |
| 10,623,089 | B2* | 4/2020 | Wyler | H04B 7/18513 |
| 2011/0021137 | A1* | 1/2011 | Laufer | H04B 7/18513 455/13.4 |
| 2011/0143656 | A1* | 6/2011 | Dankberg | H04B 7/18539 455/10 |

OTHER PUBLICATIONS

Authorized Officer Shane Thomas, International Search Report and Written Opinion issued in PCT Application No. PCT/US2018/050505 and dated Jan. 18, 2019.

* cited by examiner

*Primary Examiner* — Ankur Jain

(74) *Attorney, Agent, or Firm* — Sughrue Mion, PLLC

(57) ABSTRACT

A method for operating a satellite, wherein a beam frequency-assignment schedule for the satellite is based on rain fade information. And a communications payload for a satellite that is capable of implementing the changes required by the schedule.

2 Claims, 17 Drawing Sheets

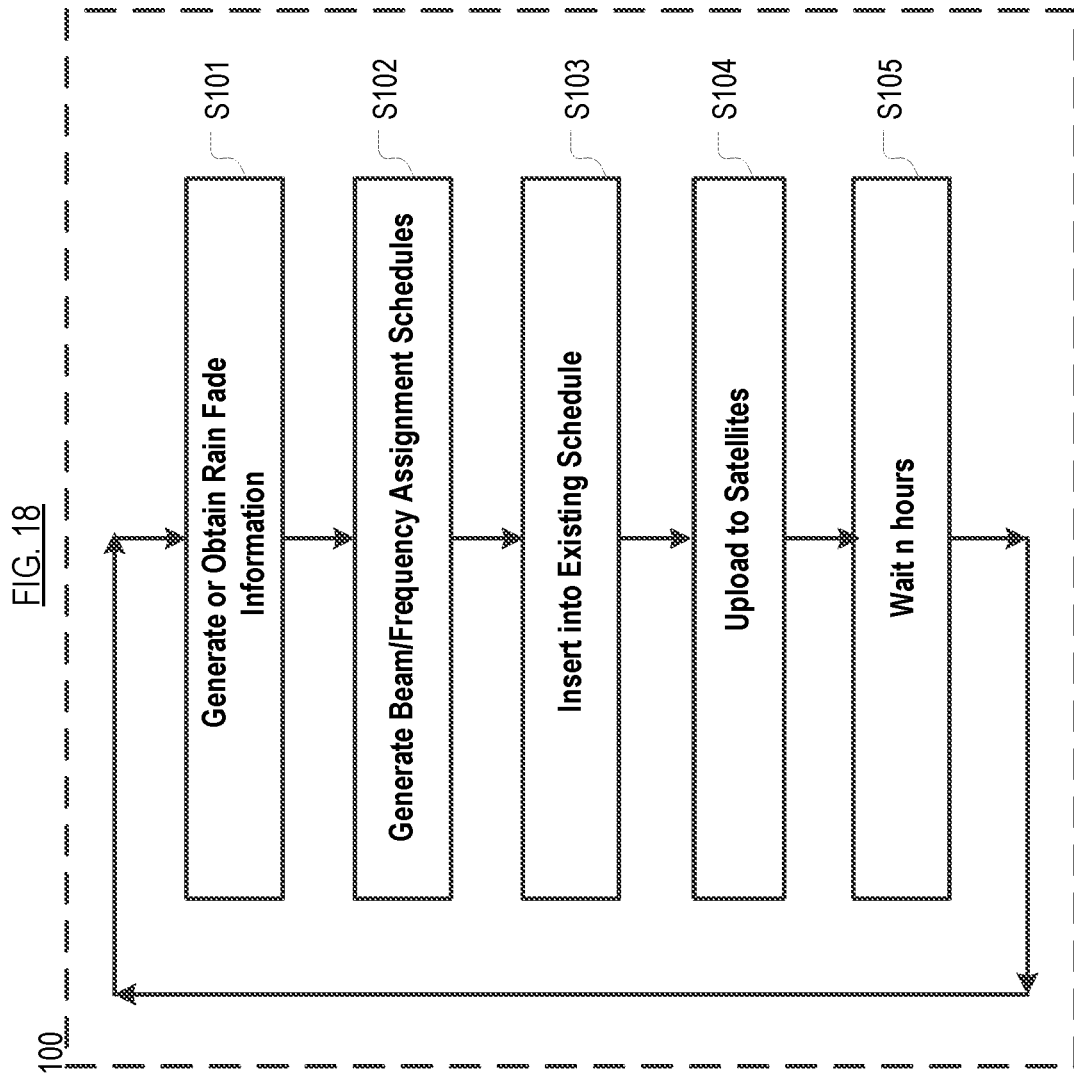

SATELLITE SYSTEM AND METHOD FOR ADDRESSING RAIN FADE

CROSS REFERENCE TO OTHER APPLICATIONS

The present application is a Divisional of U.S. application Ser. No. 16/128,263 filed on Sep. 11, 2018, which claims priority from U.S. application Ser. No. 62/557,020 filed Sep. 11, 2017, all of which are incorporated herein by reference.

FIELD OF THE INVENTION

This invention pertains to satellite communications, and more particularly to communications between medium earth orbit (MEO) satellites and ground-based receivers.

BACKGROUND OF THE INVENTION

The need for higher date rates in satellite communications prompts the use of higher radio frequencies (10-100 GHz). And improvements, of late, in the technologies that enable the handling of such high frequencies supports such use. The problem is that these high frequencies are highly susceptible to rain fade.

SUMMARY OF THE INVENTION

This invention pertains to MEO satellite constellations, wherein each satellite in the constellation has a payload that generates multiple, independently steerable spot beams, which are used for satellite-to-ground communications. In accordance with embodiments of the invention, at least some of the spot beams generated by a satellite in the constellation use different frequency bands from other spot beams generated by that satellite.

The frequency bands are assigned, at least in part, based on their relative susceptibility to rain fade. Lower-frequency bands tend to be less susceptible to rain fade but have relatively lower data rates than higher frequency bands in clear-sky conditions. By appropriately selecting spot beams for communications based on likelihood of rain fade, embodiments of the invention are capable of providing substantially persistent communications to selected geographic areas.

In some embodiments, the invention provides a method comprising generating or obtaining rain-fade information; generating a beam frequency-assignment schedule based on the rain-fade information, wherein when rain fade at a first region of the plural regions exceeds or is expected to exceed a threshold at a first time, transmissions from the first communications satellite to the first region at the first time are scheduled to switch from a first radio frequency band having a relatively higher frequency to a second radio frequency band having a relatively lower frequency; uploading the beam frequency-assignment schedule to the first communications satellite; and operating the satellite in accordance with the beam frequency-assignment schedule.

In some embodiments, the invention comprises a communications payload that enables one or more of the spot beams transmitted by the satellite's "user" antennas to switch between one relatively higher radio frequency band and another relatively lower frequency band.

In some embodiments, the invention uses the frequency-switching techniques and payload disclosed herein to address potential interference between satellites in two different constellations, such as MEO satellites and LEO satellites.

BRIEF DESCRIPTION OF THE FIGURES

FIG. 18 depicts a flow chart of a method for scheduling beam and frequency assignments in accordance with an embodiment of the invention.

DETAILED DESCRIPTION

The following definitions are to be used in this disclosure and the appended claims:
"constellation" is a group of artificial satellites operating together under shared control.
"downlink" is a communications link from a satellite to a ground location.
"uplink" is a communications link from a ground location (e.g., a gateway, a user terminal, etc.) to a satellite.
"forward link" means a communications link from a ground station (e.g., gateway) to a user. It consists of both an uplink (ground station to satellite) and a downlink (satellite to a user).
"reverse link" or "return channel" means a communications link from a user to a ground station. Like a forward link, it includes both an uplink and a downlink.

"one-way satellite" means a satellite that is used for the forward link only,

"two-way satellite" means a satellite that is used for both the forward link and the reverse link.

"LEO satellite" or "MEO satellite" or "GEO satellite" refers to a satellite in that particular orbit. There is not necessarily a difference in the satellite, other than the orbit in which it resides; that is, reference to a "type" of satellite refers to the particular orbit in which the satellite resides.

"Rain fade" is a deterioration in signal quality due to precipitation, such as rain.

"Rain fade information" means information pertaining to an actual incidence of rain, or rain fade, or a prediction of rain or rain fade based on a weather forecast or other predictive method, or a fusion of both actual and predicted rain or rain fade.

A satellite communications system in accordance with the present teachings includes ground-based gateways that send data to satellites, which then send the data down to user terminals (the forward link). The user terminals are likewise capable of sending data to the satellites, which then send the data to the ground-based gateways (the reverse link).

The satellite communications system disclosed, for example, in U.S. 2018/0062737 is an example of such a system. The satellite system disclosed in 2018/0062737 incorporates LEO, MEO, and GEO satellites. The present invention is primarily directed to MEO satellites, so for clarity and simplicity, the disclosure will focus of MEO satellite systems. It will be understood that the system shown can readily accommodate other satellites in other orbits, by simply incorporating additional gateway antennas and user terminals.

Figure 1:
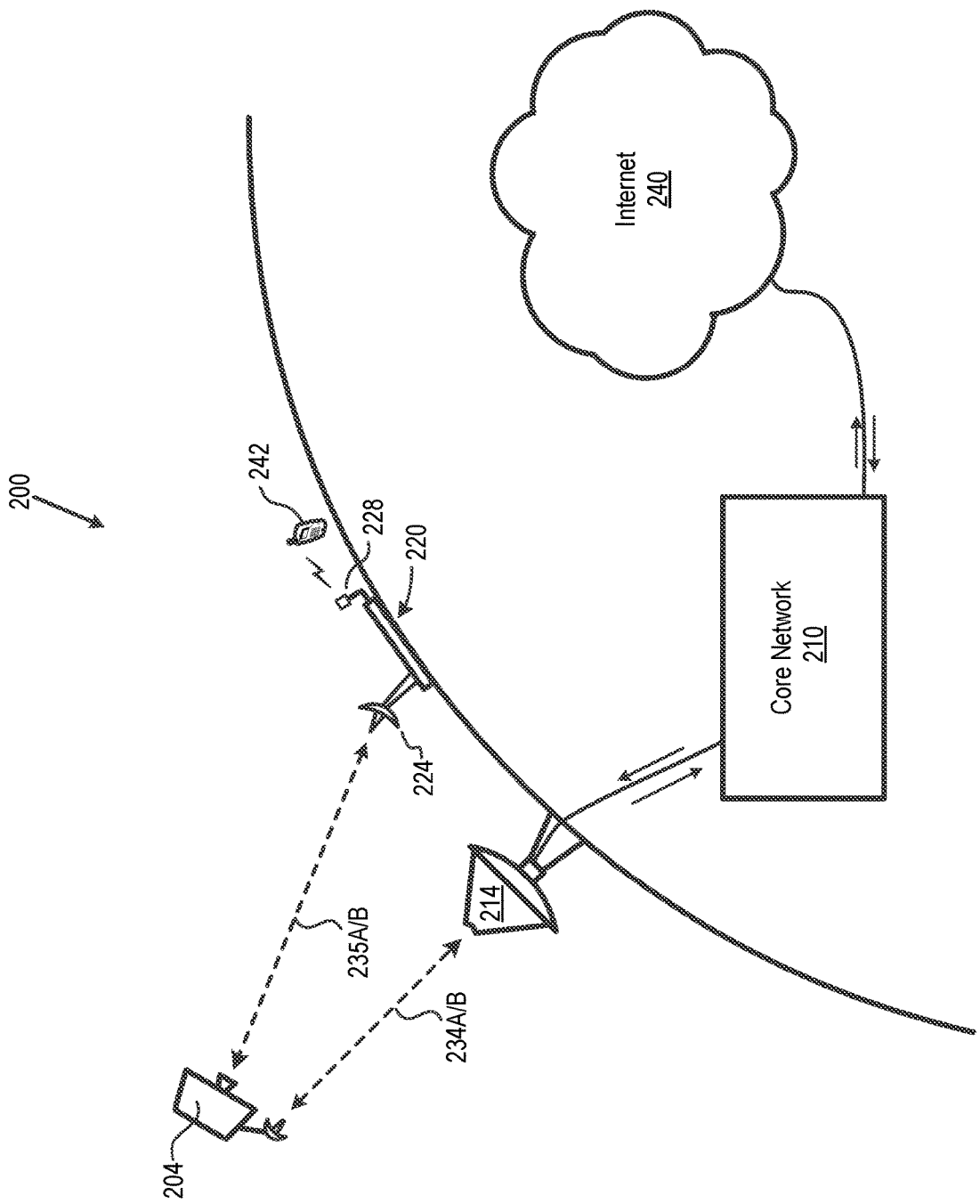
FIG. 1 depicts an MEO satellite system.

The Satellite System, FIG. 1 depicts MEO satellite system 200 in accordance with the illustrative embodiment of the present invention. Satellite system 200 includes core network 210, ground-station gateway antenna 214, MEO satellite(s) 204, and user terminal(s) 220. Also depicted, but not part of system 200, are user/user device 242 and Internet 240. It is to be understood that, for clarity of illustration, only one of each of the elements of system 200 are depicted in FIG. 1. In a functioning system, there will be many instances of each such element in system 200. This applies not only to the satellitesm, but also to ground stations (e.g., the gateway antennas, etc.) and especially to user terminals, etc.

Core network 210 provides a variety of functions in network 200 including, to mention a few, switching, routing, control and authentication. As is relevant here, core network 210 receives data from and transmits it to Internet 240. With respect to the data received from Internet 240, core network 210 routes data packets to MEO gateway 214 for transmission, via communications link 234A, to MEO satellite 204.

User terminal 220 is a user's interface to satellite system 200. In the case of residential users, for example, there is typically one user terminal 220 at the dwelling of each such residential user. In the illustrative embodiment, user terminal 220 comprises antenna 224 for communicating with MEO satellite(s) 204. Antenna 224 receives signals from MEO satellite(s) 204 via communications link 235A and it also transmits to MEO satellite(s) 204 via communications link 235B. Transmissions received by satellite 204 from antenna 224 are transmitted via communications link 234B to MEO gateway 214.

Transmissions from or to ground-based gateway antennas 214 are received by or transmitted from a gateway antenna on satellite(s) 204. Transmissions received by or transmitted from antenna 224 on user terminal 220 are transmitted from or received by user antennas on the satellite. (See FIG. 2). As will be appreciated by those skilled in the art, user terminal(s) 220 and its antenna 224 are physically much smaller than gateway antenna(s) 214.

The signals received at antenna 224 of user terminal 220 are transmitted to user device 242 via interface 228.

Figure 2:
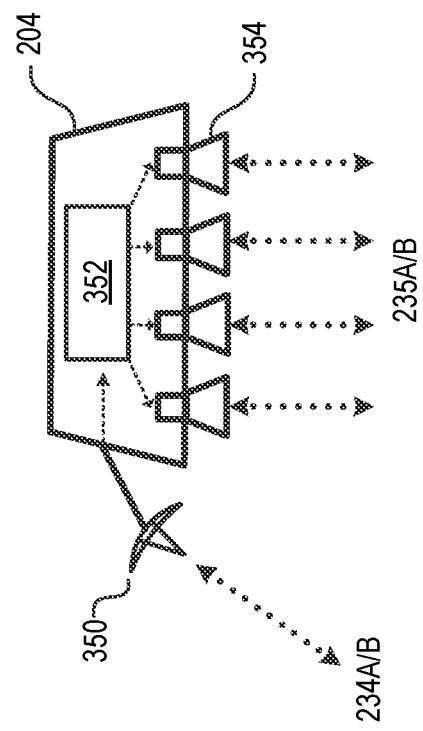
FIG. 2 depicts a satellite and its communications payload.

FIG. 2 depicts a conventional MEO satellite and its communications payload. Signals (234A) transmitted from gateway antenna 214 at a ground station are received by the satellite's gateway antenna 350 and directed to transponder 352.

As signals propagate through space, they lose strength and distort (known as "channel effects"). As such, the signals received at the satellite are approximations of the transmitted signals. Transponder 352 appropriately enhances and/or processes the received signals to counter the channel effects. The nature of the enhancement or processing can vary depending on transponder specifics.

In particular, the transponder may comprise transparent repeaters, also referred to as non-regenerative or "bent-pipe" repeaters, which simply amplify the received signals, filter out unwanted signals, and convert, as appropriate, between the uplink and the downlink frequencies. Alternatively, the transponder may comprise regenerative repeaters with processing capabilities, wherein the received signal is demodulated, decoded, re-encoded and re-modulated, basically regenerating the information contained in the signals.

Figure 3:
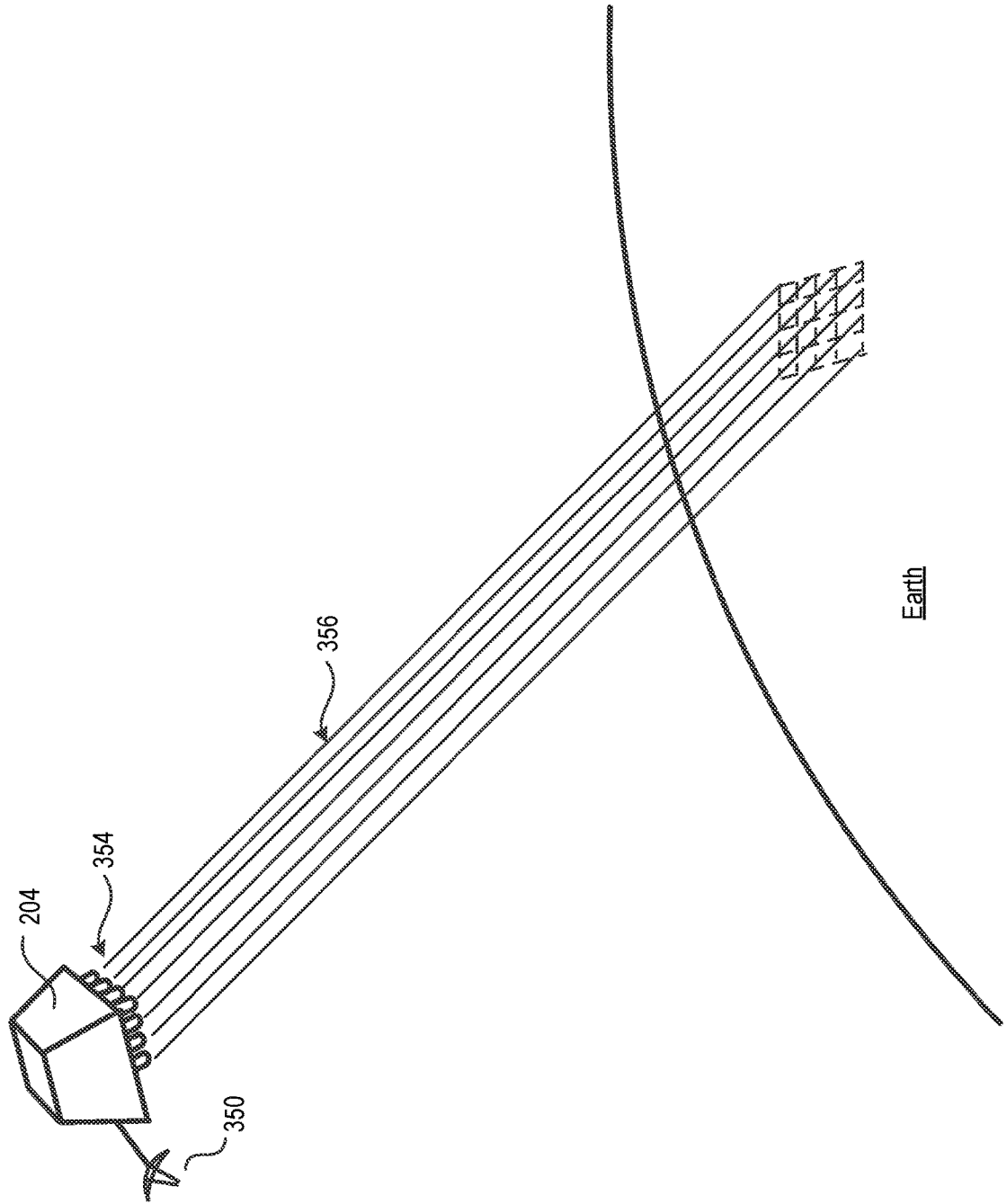
FIG. 3 depicts a satellite transmitting data, via sixteen beams, to users.

Once the signals are appropriately enhanced/processed, they are directed to the satellite's "user antennas" 354, which transmit the signals, in the form of "user beams" or "satellite beams" 355 to the user terminals, as depicted in FIG. 3.

Figure 4:
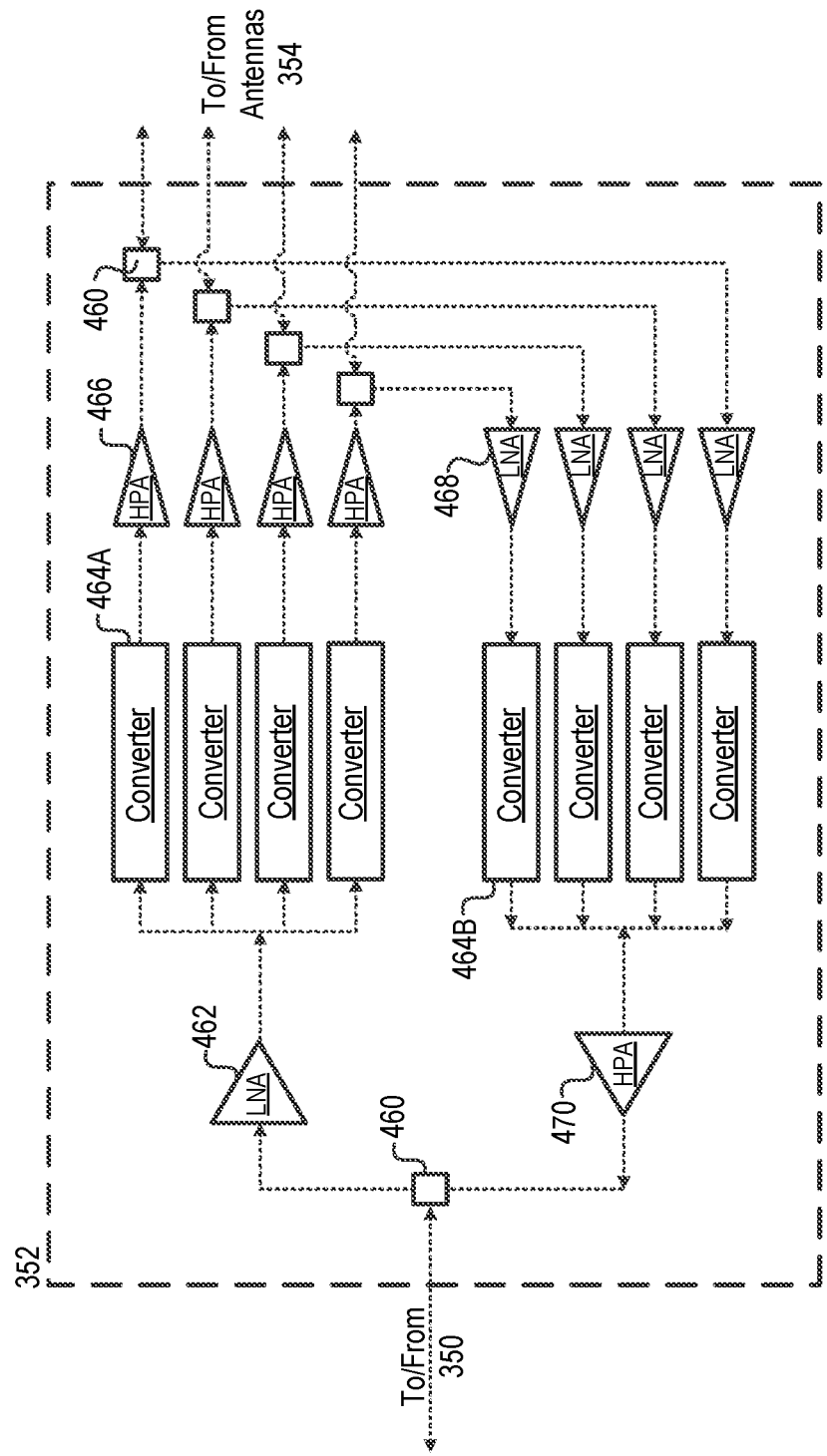
FIG. 4 depicts additional detail of the communications payload of FIG. 2.

Communications Payload. FIG. 4 depicts further detail of conventional transponder 352, suitable for use in conjunction with some embodiments of the invention. Transponder 352, which is embodied as a bent-pipe repeater, includes diplexers 460, low noise amplifiers 462 and 468, frequency down-converters 464A, frequency up-converters 464B, and high power amplifiers 466 and 470. An input band-pass filter, not depicted but typically included in transponder 352, is used to filter out unwanted signals.

Diplexer 460, which is passive device for implementing frequency-domain multiplexing, enables forward-link transmissions and reverse-link transmissions to share the same antenna. In particular, diplexer 460 that interfaces with the satellite's gateway antenna 350 directs: (a) the single $K_a$ band forward-link signal (from ground-based gateway antenna 214) to LNA 462 and (b) directs the reverse-link signal (from user terminal 220) to gateway antenna 350 for downlink to ground-based gateway antenna 214. Diplexers 460 that interface with user antennas 354 direct: (a) forward-link signals from HPAs 466 to antennas 354 for downlink to user terminal 220 and (b) direct the return-link signals (from user terminal 220) to LNAs 468.

An orthogonal mode transducer (OMT) can be used as an alternative to diplexer 460. The OMT, commonly referred to as a polarization duplexer, can combine or separate two orthogonally polarized microwave signal paths. Use of the OMT requires that the receive signal and the transmit signal have a different polarization state. For example, the transmit signal might be right-hand circularly polarized and the receive signal might be left-hand circularly polarized.

Addressing the forward link first, LNA 462 is a low noise amplifier for amplifying the weak RF signal received from gateway antenna 214 of a ground station. Once amplified, the received signal is split by an RF splitter (not depicted)

into plural signals corresponding to the number of (user) antennas that transmit beams to users. Although FIG. 3 depicts four such signals, the number of signals will typically be greater. After splitting, the signals are fed to frequency down-converters 464A, which down convert the $K_a$ band signals to the appropriate RF carrier frequency (for each antenna beam) in the $K_u$ band for downlink.

The output signals from frequency down-converters 464A are typically filtered (not depicted) and then each signal is amplified in high power amplifiers 466. The amplified signals are then directed by diplexers 462 to user antennas 354 for downlink. Both polarization states can be used in the user downlink, thus doubling the use of each frequency channel.

Turning now to the reverse link, $K_u$ band signals received from user terminal 220 are directed by diplexers 460 to low noise amplifiers 468. These amplifiers amplify the very weak signals received from user terminal 220. The amplified signals are fed to frequency up-converters 464B, which up convert the signals to $K_a$ band. The signals from the up-converters are combined in an RF combiner (not depicted), and then amplified in high power amplifier 470. The combined, amplified signal is then directed by diplexer 460 to the satellite's gateway antenna 350 for transmission to the gateway antenna of a ground station. In this embodiment, the uplink frequency was assumed to be $K_u$ band; the uplink can be either $K_a$ band or $K_u$ band, dependent on factors such as regulatory limits, amplifier technology, and/or susceptibility to rain fade.

Figure 5:
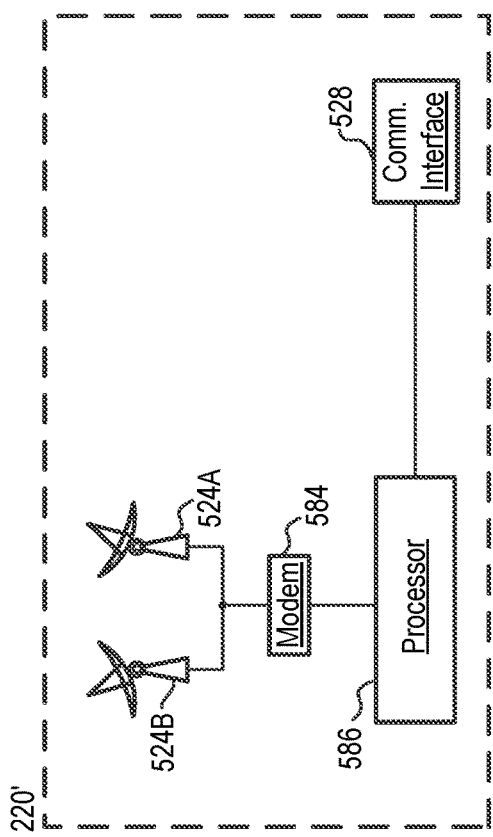
FIG. 5 depicts a first embodiment of a user terminal.
Figure 6:
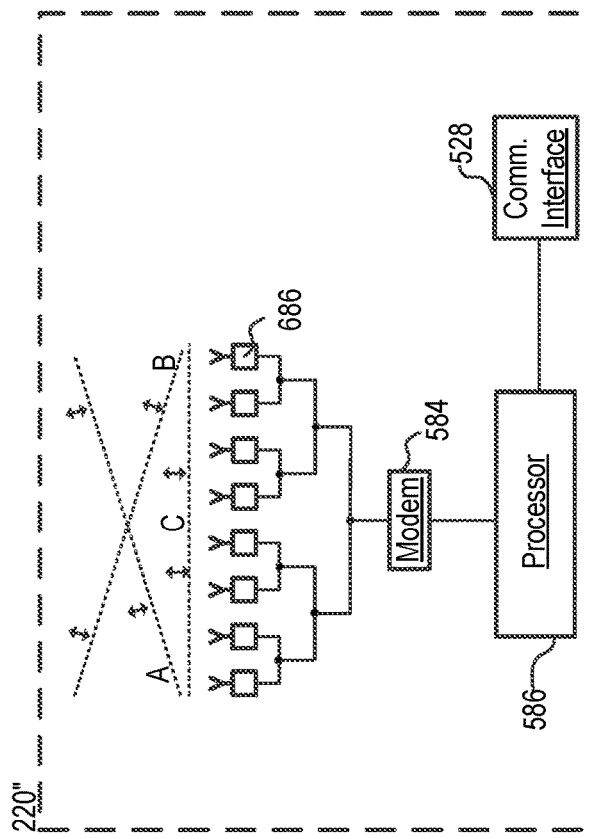
FIG. 6 depicts a second embodiment of a user terminal.

User Terminal. FIG. 5 depicts a first embodiment 220' of user terminal 220 depicted in FIG. 1. User terminal 220' includes active MEO antenna 524A that tracks an MEO satellite and optional swing-back MEO antenna 524B. The purpose of the swing-back antenna is to wait idly while antenna 524A tracks an MEO satellite until it travels out of view. Once antenna 524A losses the MEO satellite it was tracking, swing-back antenna 524B picks up the next MEO satellite, at which point antenna 524A becomes idle.

The pair of antennas connects to modem 584. The modem connects to processor 586 where, with respect to downlink, the information received at antennas 524A or 524B is transmitted to users via any one of several possible interfaces devices 528 supporting various communications protocols (e.g., Ethernet, WiFi, LTE, etc.).

In user terminal 220', the signals from an antenna and its swing-back partner are merged before they are fed to a modem, such as via an analog switch. Alternatively, the data from each antenna can be converted from analog to digital prior to the modem, and switching is performed in the digital domain.

With respect to transmission to a satellite, a signal from a user, relayed via communications interface 528, is processed in processor 586 and directed to modem 584.

FIG. 5 depicts a second embodiment 220" of user terminal 220 of FIG. 1. User terminal 220" incorporates an active, electronically steerable array antenna, commonly used in radar and communications. The antenna is capable of receiving or generating wavefronts A, B, and C, which propagate in different directions in space for communications with a satellite, depending on its location.

Active elements within each antenna element 686 make this possible by serving to amplify the signals in either direction and also by applying a variable amount to phase delay in order to create wavefronts inclined at various angles.

The signals then are received by or transmitted from modem 584, which is connected to processor 586. Communications to and from a user is via interface 728, as discussed in conjunction with FIG. 5.

An advantage of user terminal 220" is the mechanical simplicity (e.g., no motors, etc.), as well as the ability to steer the beam from side-to-side in a matter of microseconds (c.a. 10 microseconds). This enables a single antenna array to seamlessly switch from one satellite to another in the same constellation or between constellations.

The operation of the satellite communications system 200 is dependent upon handoffs as satellites orbit around the Earth. At least two different types of handoffs occur during the course of a day: a gateway handoff and a satellite handoff. For clarity, the following discussion is directed to forward-link (and specifically satellite-to-ground) communications, understanding that the same principles apply in the reverse direction.

Figure 7:
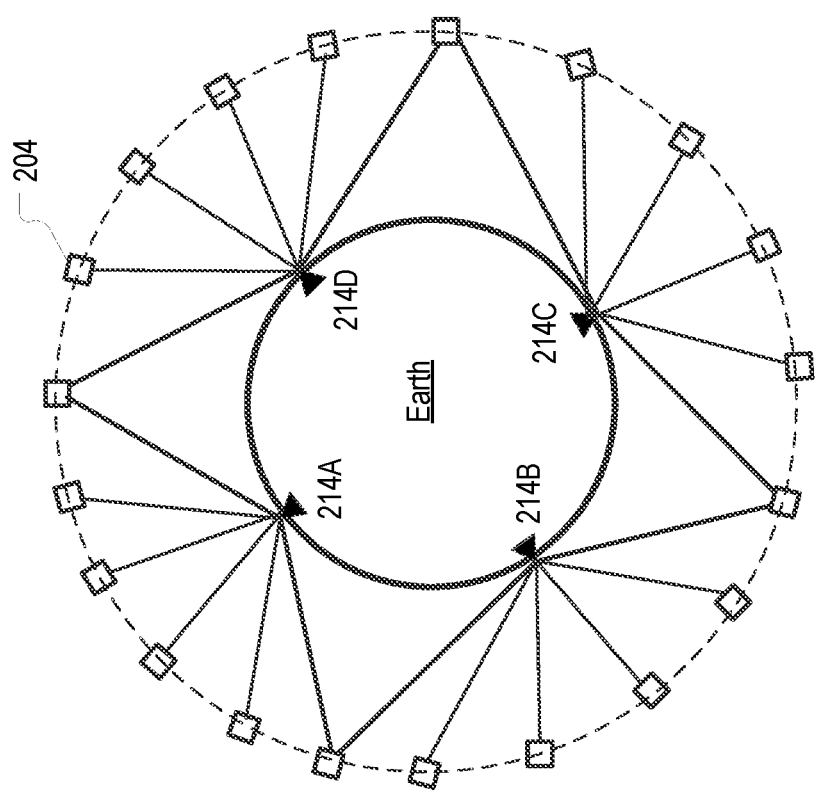
FIG. 7 depicts a satellite orbiting the Earth, communicating with a plurality of gateways in conventional fashion.

Gateway handoff. During the course of an orbit, each satellite contacts a ground gateway, then breaks that contact when the satellite is departing that gateway to contact the next gateway. FIG. 7 depicts satellite 204 (at different points in time) orbiting the Earth, communicating in turn with gateways 214A, 214B, 214C, and 214D.

Figure 8:
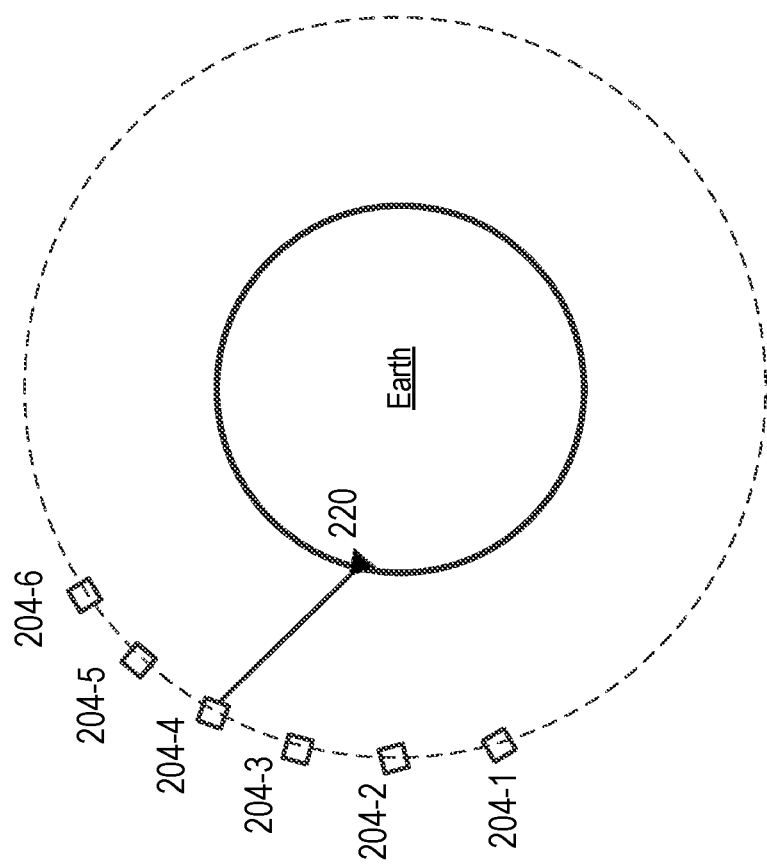
FIG. 8 depicts a user terminal establishing contact with selected satellites in conventional fashion.

Satellite handoff. During the course of a day, a user terminal contacts a satellite, breaks that contact when the satellite is receding, and then contacts an approaching satellite. FIG. 8 depicts user terminal 220 establishing contact, sequentially, with satellites 204-1, 204-2, 204-4, and 204-6. In the illustration, user terminal 220 does not establish communications with satellite 204-3 and 204-5 because these satellites are unavailable or suboptimal.

Table I below shows a timetable for satellite 204 communicating with gateways 214A, 214B, 214C, and 214D.

TABLE I

| Timetable for Satellite to Gateway Communications | | | |
| --- | --- | --- | --- |
| 214A | 214B | 214C | 214D |
| Satellite 204 | | | |
| -------------- Time ------------------→ | | | |

Table II below shows a timetable for user terminal 220 communicating with satellites 204-1, 204-2, 204-4, and 204-6.

TABLE II

| Timetable for User Terminal to Satellite Communications | | | |
| --- | --- | --- | --- |
| 204-1 | 204-2 | 204-4 | 204-6 |
| User Terminal 220 | | | |
| -------------- Time ------------------→ | | | |

Figure 9:
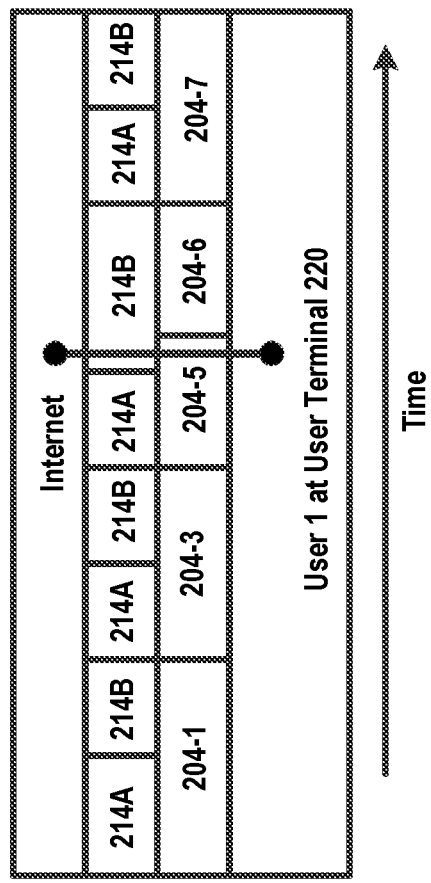
FIG. 9 depicts, via a chart, the overall link from a user terminal to the Internet, always making a single path through the communication system at any point in time, in conventional fashion.

Together, the overall link from user terminal 220 to gateway G1 through G4 (and thus the internet) continually hops from satellite to satellite and gateway to gateway, always making a single path through the communication system at any point in time, as discussed in conjunction with FIG. 9.

For example, and with reference to FIG. 9, at one point in time, data moves from the Internet to gateway 214B to satellite 204-5 to user-1 via user terminal 220. In this example, user-1 happens to live somewhere between gateways 214A and 214B, so the satellites in view handoff between these gateways. At some point later in time, the geometry will dictate that satellite 204-6 is always communicating with gateway 214B during the contact with the user. In this system, service is persistent, but not necessarily ubiquitous.

Rain Fade and Embodiments of the Invention.

For the purposes of the discussion that follows and the appended claims, it is to be assumed that frequency bands are assigned based on their relative susceptibility to rain fade. Lower-frequency bands tend to be less susceptible to rain fade but have relatively lower data rates than higher frequency bands in clear-sky conditions. As such, a satellite will be scheduled to transmit at relatively higher frequencies unless rain fade is expected or observed.

Figure 10:
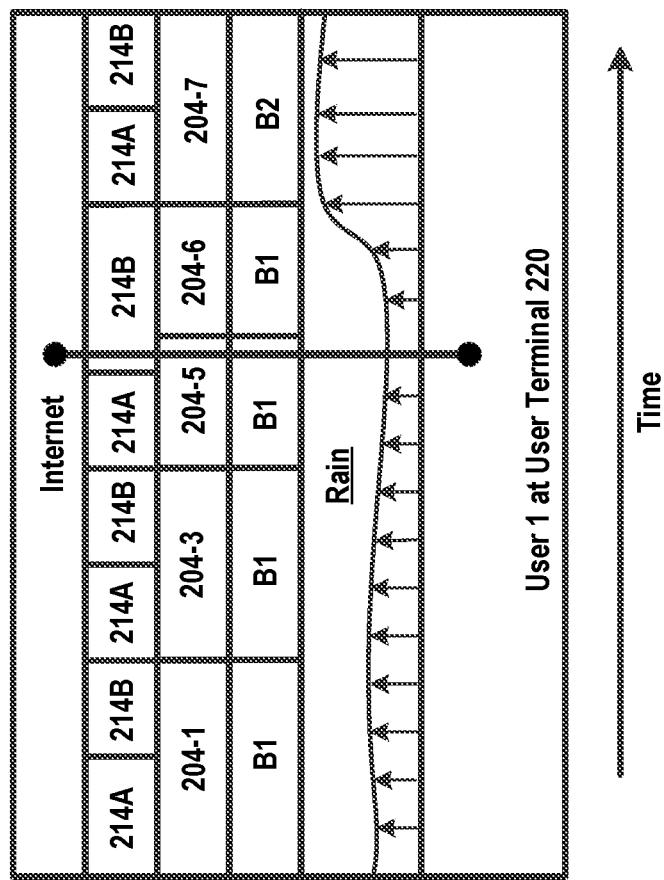
FIGS. 10 and 11 depict a respective chart and schematic for a first embodiment in accordance with the invention, wherein a satellite's payload is designed and operated to provide plural spot beams, each with a fixed radio band, and its application to rain fade.

Payload variant 1: A given spot beam has a fixed radio band. During a user terminal's contact with a satellite, the payload transmits data through one spot beam, and the spot beam's location on the ground remains fixed during the contact period. In this variant, as depicted in FIG. 10, each user beam is only capable of one radio band. For example, at one point in time, data goes from the Internet to gateway 214B to satellite 204-5 on beam B1 through clear sky to user 1. When the rain fade becomes significant, the next satellite will use beam B2, which uses a frequency that is relatively lower than that used by beam B1 and is therefore better for rainy conditions.

In some embodiments, the payload includes nine user beams, seven of which communicate over a relatively higher frequency band, and the other two over a relatively lower frequency band. The command and control center on the ground assigns the two beams that communicate over the relatively lower frequency to areas with the highest likelihood of rain fade. In other embodiments, the apportionment between relatively higher frequency bands and relatively lower frequency bands is different. This is determined by the frequency converter in the payload.

Figure 11:
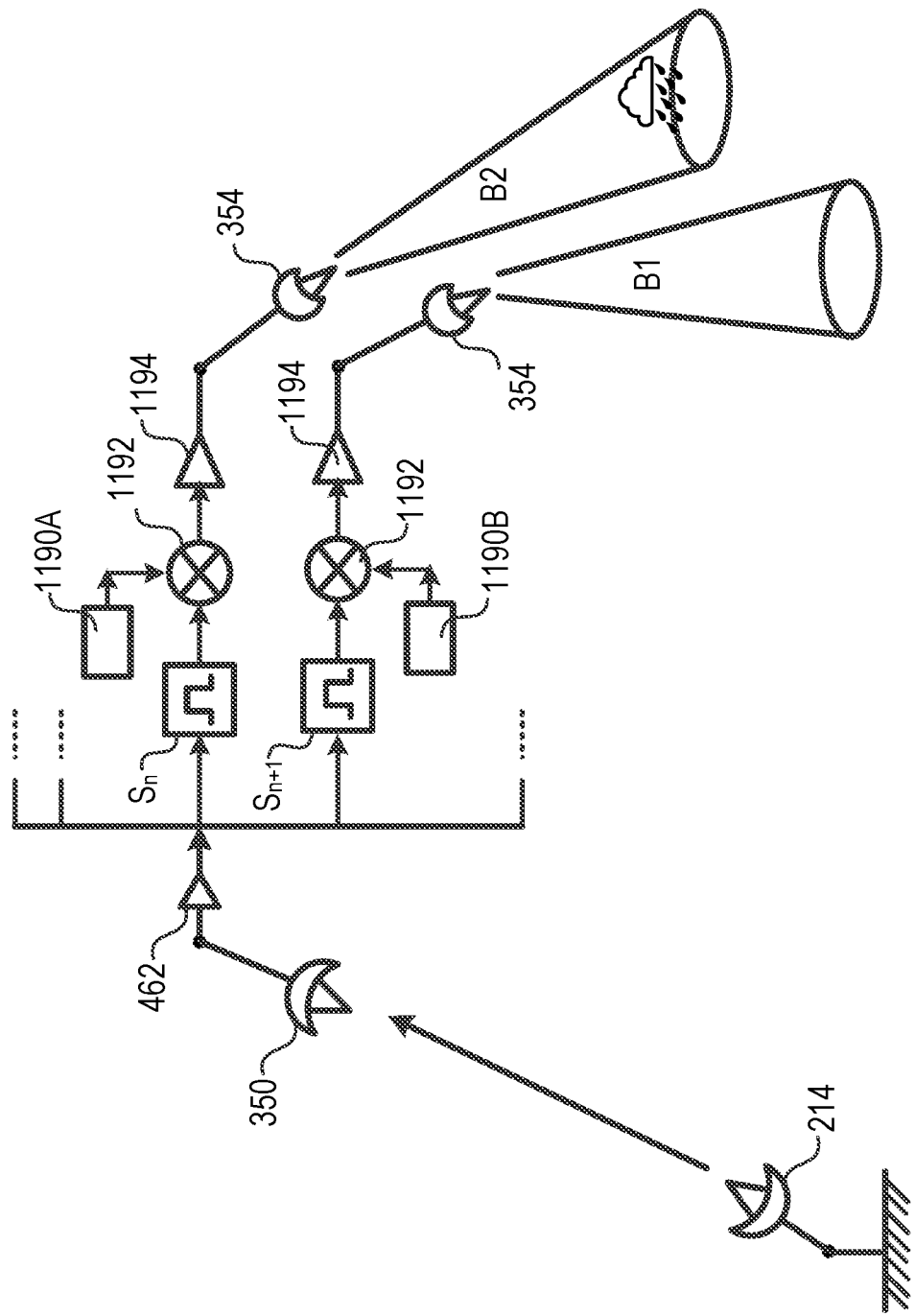

FIG. 11 depicts payload variant 1, wherein each beam is fixed to a particular radio frequency band. Low noise amplifier 462 amplifies the RF signal received from gateway antenna 214, as received by the satellite's gateway antenna 350. The uplink beam contains all of the downlink channels.

Once amplified, the received signal is split by an RF splitter (not depicted) into plural signals corresponding to the number of (user) antennas that transmit beams to users. For clarity, only two signals $S_n$ and $S_{n+1}$ and their radio frequency paths are depicted in this figure.

The local oscillators 1190A and 1190B convert the uplink frequency band to the downlink frequency band, but the choice of downlink band is fixed. For example, the local oscillator 1190A converts to frequency "2," and local oscillator 1190B in converts to frequency "1." Frequency 2 is relatively lower than frequency 1, the former frequency being more appropriate when rain is present. Mixers 1192 takes a local oscillator tone to convert the input carrier frequency to output another frequency. The signals out of the mixers are amplified in high power amplifiers 1194 and ultimately directed to user antennas 354 for downlink.

In situations in which the prediction of rain is incorrect for variant 1, there might be occasional occurrences of rain fade. The reason for this is that once scheduled, beams cannot be re-pointed without loss of service. To mitigate these situations, a beam is kept unscheduled so that it can be directed to a rainy region, as necessary. Alternatively, if the MEO satellites are used in conjunction with LEO satellites, the LEO satellites can be used to offload the data to users.

Payload variant 2: a given spot beam can switch between one radio band and another. To implement this variant, either the frequency convertor can switch between bands, or two separate frequency converters and amplifiers are used, both carrying the same user data; a switch after the amplifiers selects which band to use.

Figure 12:
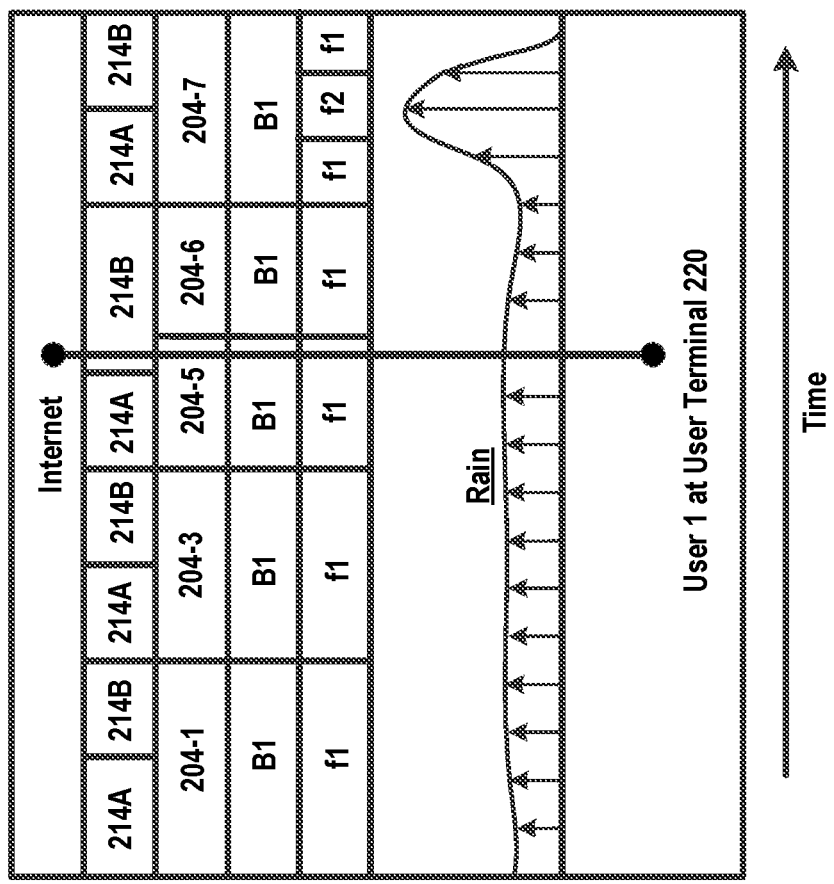
FIG. 12 depicts, via a chart, a second embodiment in accordance with the invention, wherein a satellite's payload is designed and operated to provide plural spot beams, and its application to rain fade.
Figure 13:
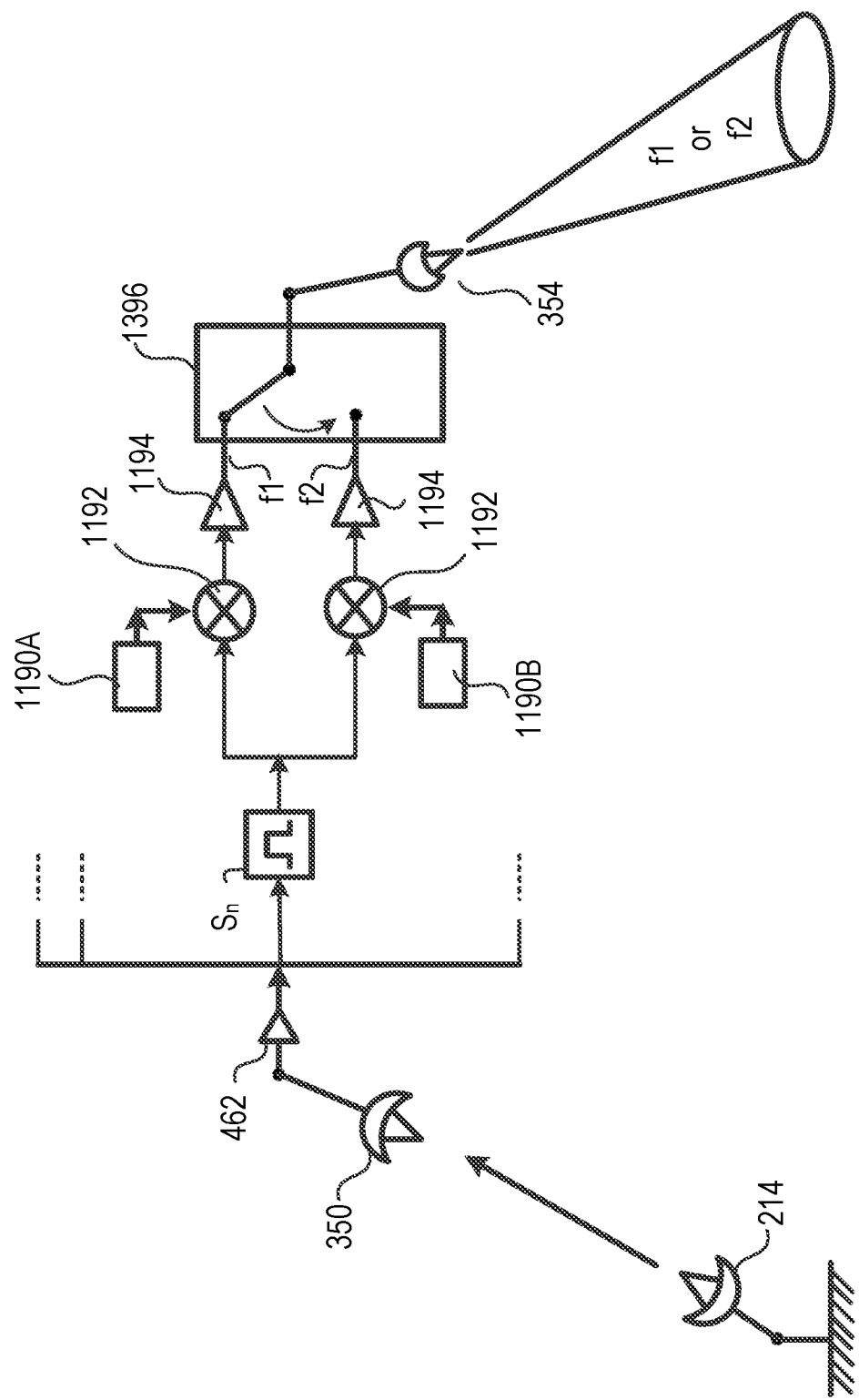
FIG. 13 depicts, via schematic, a first arrangement wherein each spot beam can switch between radio bands.

Referring now to FIG. 12 at one point in time, data goes from the Internet to gateway 214B to satellite 204-5 on beam B1, which uses frequency f1 through clear sky to user 1. At another point in time, during a brief downpour with satellite 204-7, the user will receive service on frequency f2 over beam B1. FIG. 13 depicts payload variant 2, wherein a given beam can be switched, via switch 1396, between a high frequency band (e.g., frequency f1) and a low frequency band (e.g., frequency f2). The components shown in FIG. 12, and the operation thereof, are otherwise that same as those shown in FIG. 10.

Figure 14:
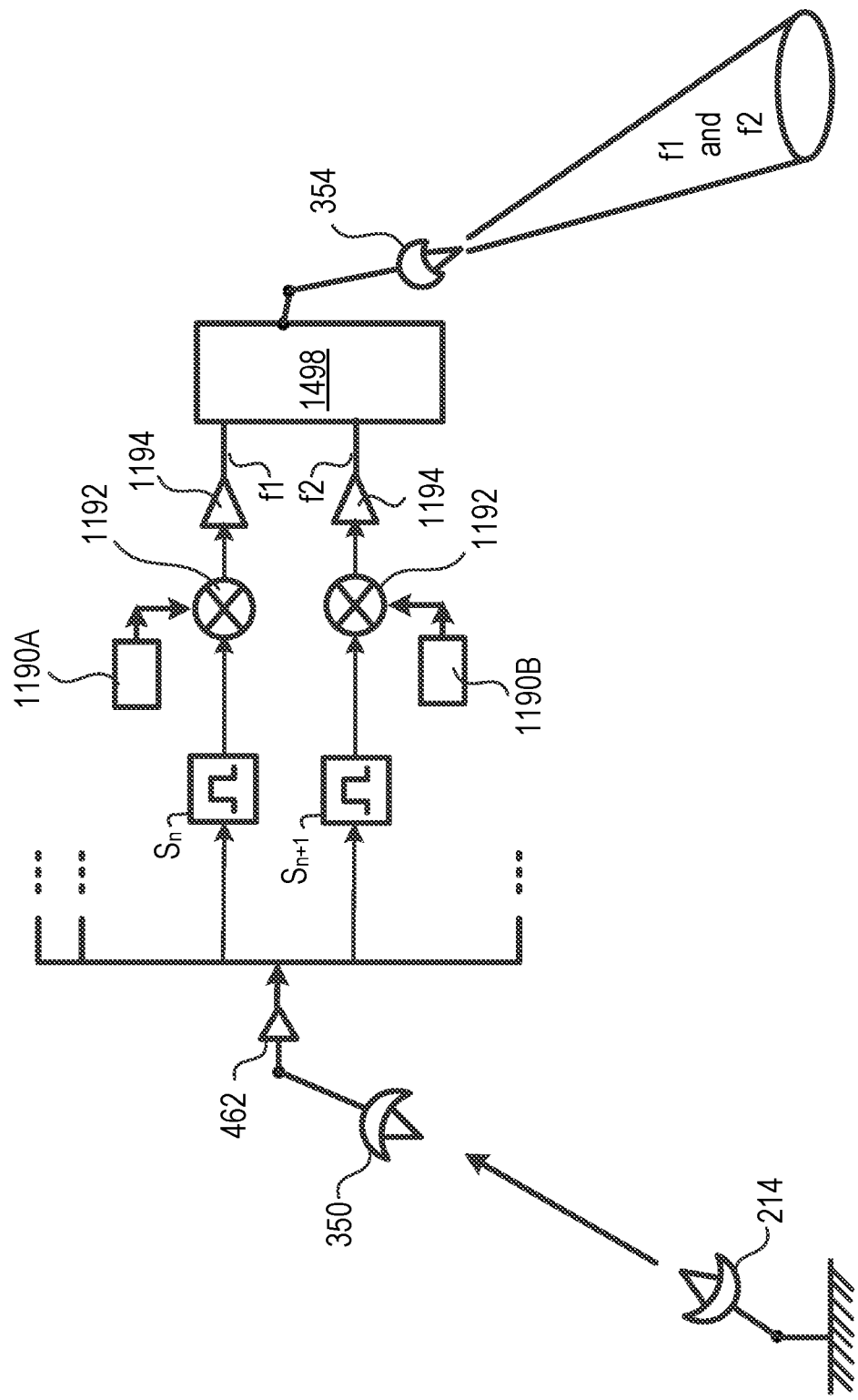
FIG. 14 depicts, via schematic, a second arrangement wherein each spot beam can simultaneously transmit on multiple radio bands.

Payload variant 3: a given spot beam can simultaneously transmit on multiple radio bands. In this variant, as depicted in FIG. 14, there are two separate frequency converters and amplifiers that are combined at the antenna input. The beam simultaneously transmits at frequencies f1 and f2. Diplexer 1498 combines the two bands into one path. Since frequencies f1 and f2 each have their own channel filter upstream of the mixer, the ground network can assign the certain users to the uplink channel for frequency f1 and other users, then experiencing rain, to the uplink channel for frequency f2.

The data routing works as if the two frequency converters are on separate beams, as in the first variant, with the difference being that these beams are overlaid on top of each other on the ground. The spot beam size is hundreds of kilometers wide, and heavy rain typically covers only part of it. The ground network thus assigns traffic in the high frequency band to land in places with no rain, while traffic in the low frequency band is directed to rainy locations.

Figure 15:
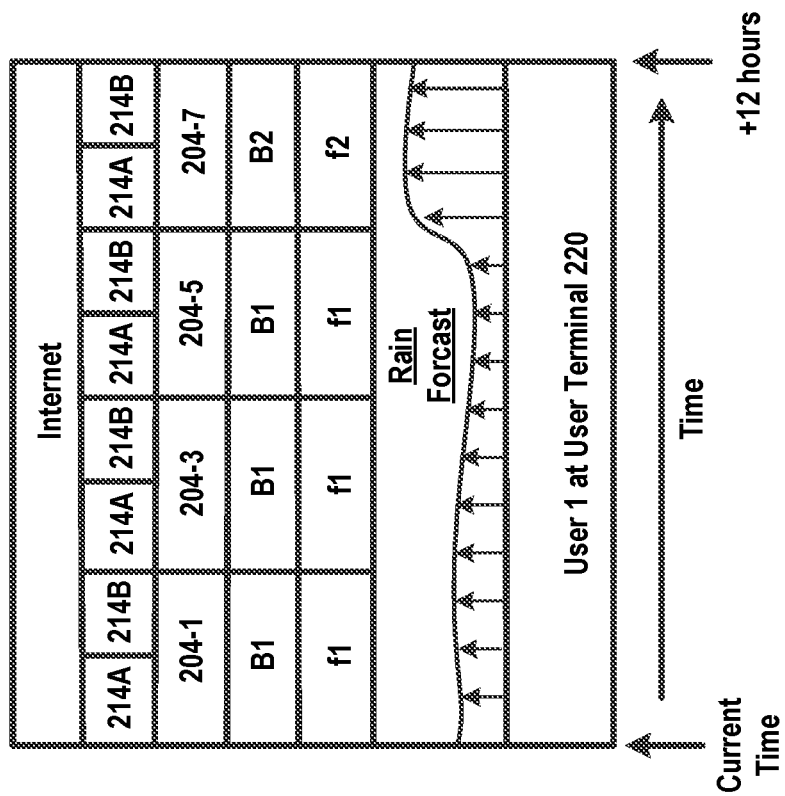
FIG. 15 depicts, via a chart, a first embodiment of a method in accordance with the invention for addressing rain fade, wherein meteorological forecasts are used.

Feedback variant 1: using meteorological forecasts to predict rain fades. Where available, weather forecasting provides accurate and timely predictions of rain fall by incorporating a network of sensors and fluid dynamics models. For every user terminal or groups of neighboring user terminals, this forecast data can be used to generate beam and frequency assignment schedules for the next 12 hours or so. Referring now to FIG. 15, a 12-hour rain forecast from local weather center for user 1 is entered into core network 210 (FIG. 1) to create a 12-hour plan for communications. Near the end of the period, it will rain enough that satellite 204-7 will communicate with that user using beam B2 on frequency f2.

Feedback variant 2: using signal quality data from the user terminal to predict rain fades. The actual rain fade history can be measured by the user terminal. This is done by computing the expected signal-to-noise ratio (SNR) and comparing it to the actual SNR (e.g., subtracting the actual from the expected, forming a ratio, etc.). Based on past experience, etc., the results of the comparison will indicate whether rain fade will be a problem that needs to be addressed. For example, if the difference in the SNRs exceeds a certain value, or a ratio of measured to actual SNR threshold falls below a certain value, etc., rain fade is determined to be problematic and must be addressed by switching frequency. This implies that rain fade is the only reason for a drop in SNR, which is not strictly true. However, other causes such as equipment failure can be ruled out by correlating with neighboring user terminals. Also, other causes such as interference from other radio sources or the sun are brief, and can be filtered out by processing techniques such as averaging.

In a first embodiment, signal-quality data is used by extrapolating into the future from past trends. In a second embodiment, signal-quality data is obtained from multiple users in a dense region. Using this method, a rain cell is "tracked" as a moving object among the users, and its future position may be projected from current speed and direction.

In a third embodiment, a reactive rather than predictive approach is taken to the use of signal quality. This approach is best suited for use with the third payload variant, where a high and low frequency band can co-exist in the same beam at the same time. If the rain fade rises above a certain threshold, then the user is switched from the high-frequency band to the low-frequency band in the same beam. When the rain fade decreases, the user is switched back to the high-frequency band. Implementing the feedback for this system requires a return-direction communication path, such as provided by an LEO constellation of satellites. The two feedback variants may be combined, for example, in a Kalman filter or other estimation algorithm.

Figure 16:
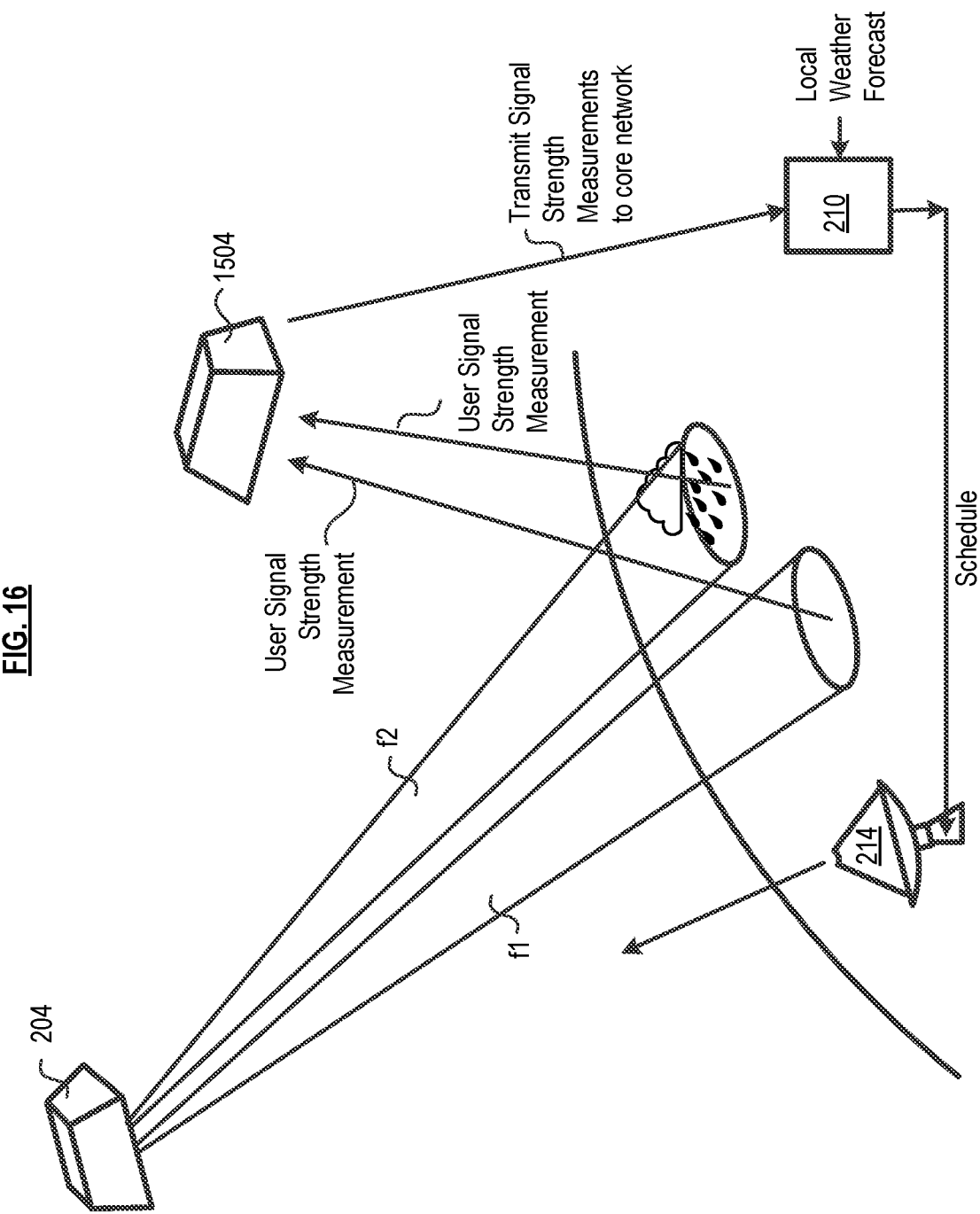
FIG. 16 depicts a second embodiment of a method in accordance with the invention for addressing rain fade, wherein signal quality data from a user terminal is used.

Referring to FIG. 16, the rain forecast is generated by fusing together the local weather forecast and the user's signal-strength measurement, the latter of which is fed back to core network 210 via from LEO satellite 1504. Frequency-assignment schedules are then generated from the rain forecast and transmitted to gateway antenna 214, which, in turn, transmits the schedule to MEO satellite 204.

Figure 17:
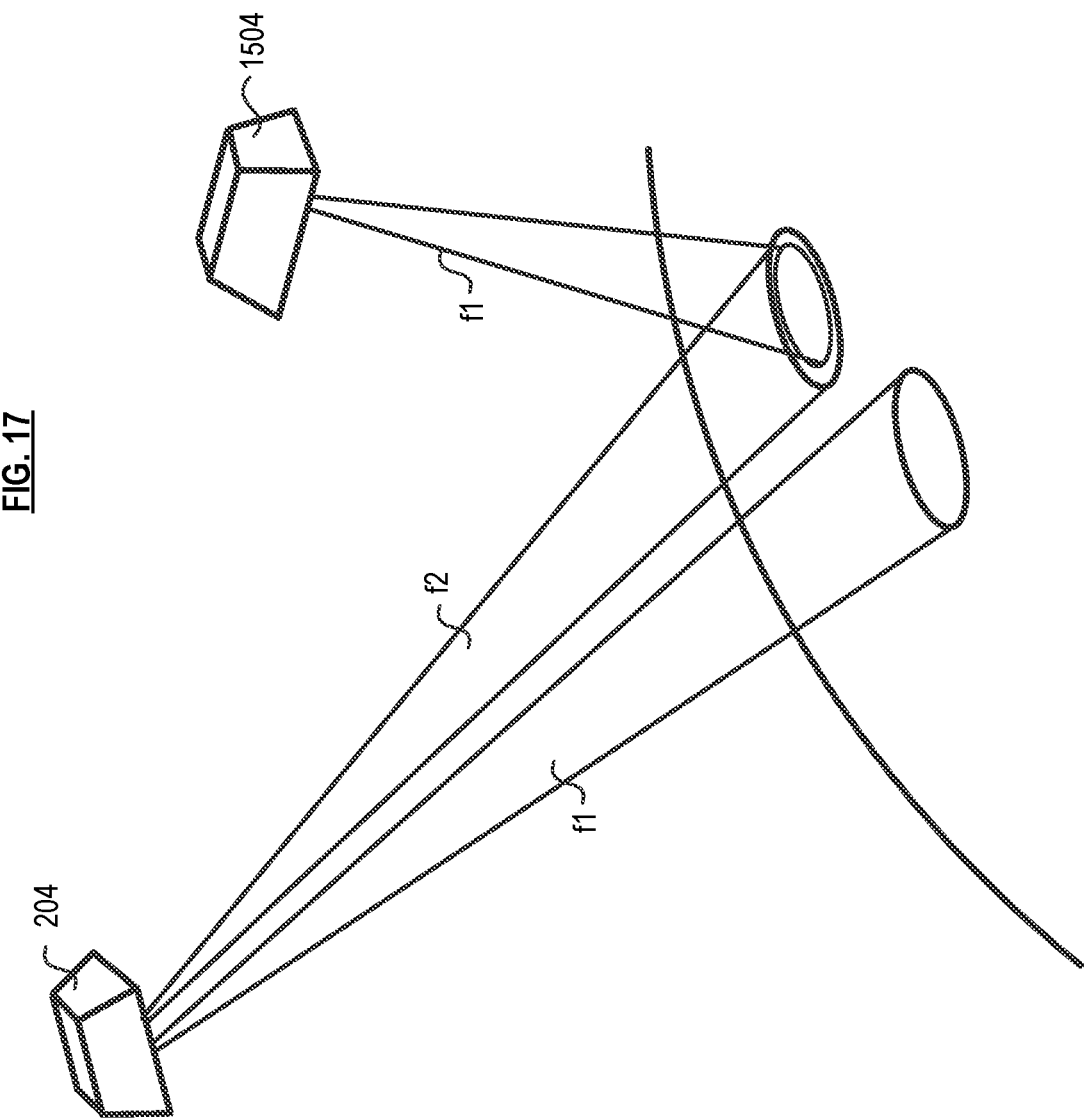
FIG. 17 depicts an embodiment in which payloads in accordance with the invention are used to address the problem of interference with other satellite constellations using the same radio frequency bands.

Interference with LEO Satellites. Embodiments of the invention solve another problem, which is the predictable interference with other constellations that use the same radio frequency bands. Referring now to FIG. 17, in such "in-line" events, a user terminal (e.g., user terminal 220, etc.) will see both LEO and MEO satellites in the same location, using the same frequency. In such scenarios, the frequencies of the MEO system can be reconfigured to avoid using the same band as the LEO system. In the example depicted in FIG. 17, satellite 204-7 continues to serve user 1 by switching to frequency f2, even though there are clear skies.

FIG. 18 depicts a flow chart of method 100 in accordance with the illustrative embodiment. In the embodiment depicted in FIG. 18, a schedule for frequency assignments extends 12 hours into the future. Every n hours, a new schedule is created to extend the existing schedule into the future. The update can occur as desired, (e.g., n=0.25 hrs., n=1 hrs., etc.).

Thus, in operation S101, rain-fade information is obtained or generated. The rain-fade information can be real time data, or a prediction, or a synthesis of both, and is obtained or generated in accordance with any of the approaches previously discussed. Based on the information, a beam frequency-assignment schedule is generated per operation S102. This schedule provides, for a nominal period (e.g., 12 hours, etc.), at what frequency a particular antenna beam will transmit. In operation S103, this newly generated schedule updates the existing beam frequency-assignment schedule. This might or might not cause a change in the existing schedule (based on changes in weather or changes in the forecast and the extent of the change). The newly generated schedule is uploaded to the satellites for execution in operation S104. After a period of time, per operation S105, operations S101 through S104 are repeated.

It is to be understood that the disclosure describes a few embodiments and that many variations of the invention can easily be devised by those skilled in the art after reading this disclosure and that the scope of the present invention is to be determined by the following claims.

What is claimed:

1. A method for operating a communications satellite, the method comprising:

obtaining rain-fade information on a periodic basis, wherein the rain-fade information includes first information derived from a local weather forecast and second information derived from a user signal strength measurement, and wherein the second information is obtained from a low earth orbit (LEO) satellite; generating a beam frequency-assignment schedule based on the rain-fade information; generating a modified beam frequency-assignment schedule by altering an existing beam frequency-assignment schedule based on the rain-fade information;

uploading the modified beam frequency-assignment schedule to a medium earth orbit (MEO) satellite; and transmitting, by the MEO satellite, signals in accordance with the modified beam frequency-assignment schedule.

2. The method of claim 1 wherein the rain-fade information is obtained from signal strength measurements.

* * * * *